Figure 1:
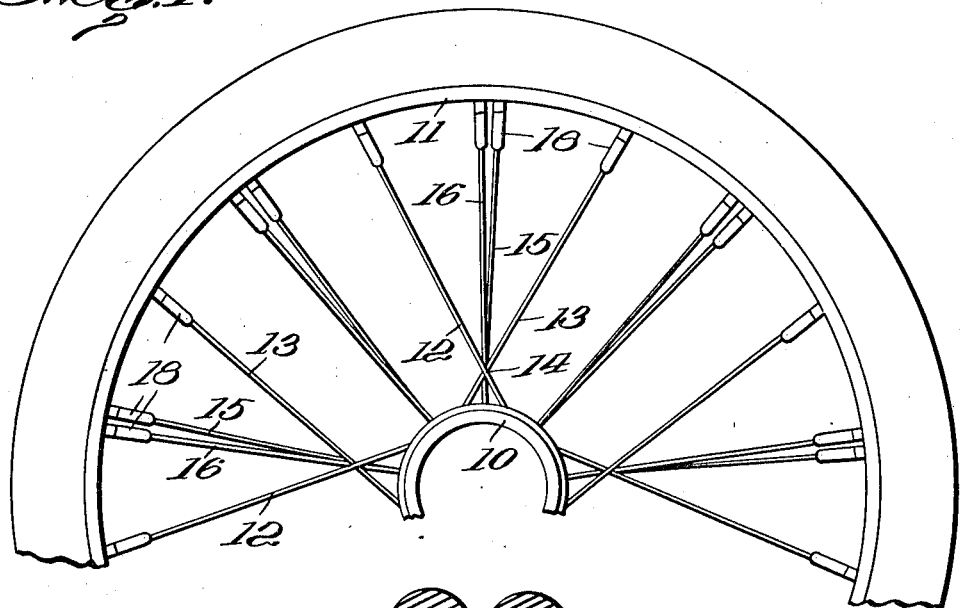

H. H. MORETON.
VEHICLE WHEEL.
APPLICATION FILED APR. 11, 1918.

1,314,092. Patented Aug. 26, 1919.

Inventor
Henry H. Moreton
By ____
Attorney

UNITED STATES PATENT OFFICE.

HENRY H. MORETON, OF STONY POINT, NEW YORK, ASSIGNOR TO MORETON COMPANY, INC., A CORPORATION OF DELAWARE.

VEHICLE-WHEEL.

1,314,092.  Specification of Letters Patent.  Patented Aug. 26, 1919.

Application filed April 11, 1918. Serial No. 227,989.

*To all whom it may concern:*

Be it known that I, HENRY H. MORETON, a citizen of the United States, residing at Stony Point, in the county of Rockland and State of New York, have invented new and useful Improvements in Vehicle-Wheels, of which the following is a specification.

This invention is an improved vehicle wheel of the wire spoke type, designed particularly for heavy work, although not limited in this particular.

Heretofore, wheels of the wire spoke type for motor vehicles have been designed and used to some extent, but such wheels are more or less imperfect for the reason that while they are constructed to take care of the driving and braking strains, as well as the side torque, they have not adequately provided for the resistance of such strains as are produced by sudden shocks upon the wheel while traveling over a rough road, and their use on motor trucks has been practically impossible. For instance, it is common practice to supplement the driving and braking spokes by additional spokes, usually laterally inclined transversely of the wheel rim, on the theory that they suspend the rim in somewhat the same manner as a truss, it being assumed that such supplemental spokes will take care of all strains other than the driving and braking strains. But in such instances a true truss is not provided and there is no technically true suspension of the rim. In fact, the lack of co-operation of the supplemental spokes is such that a heavy shock on the rim of the wheel, due to encountering a rock or other obstruction, and acting radially as well as laterally of the wheel, will produce strains which cannot be resisted by the spokes arranged as stated. This failure to sustain said strains not infrequently causes a total collapse of the wheel structure, and is a serious source of danger in the operation of wheels of this type, especially for the heavier vehicles. Because of the inherent weakness of the wire spoke wheel, its usefulness is quite limited.

One of the objects of the invention is to provide a true suspension wheel of the wire spoke type, capable of use on motor trucks and other vehicles constructed to carry heavy loads. A further object is to provide a wheel constructed to take care of the driving and braking strains, as well as the side torque, and having means for presenting a maximum resistance to such strains as are encountered during operation over rough roads, and irrespective of the direction from which the shocks may be applied. A further object is to provide an improved wheel in which the spokes are so arranged and tensioned that all strains, no matter from what source they may emanate, are uniformly distributed throughout the wheel structure, whereby the wheel is greatly strengthened and the probability of collapse from any cause is reduced to a minimum. A further object is to provide a combination of driving and braking spokes and truss spokes so disposed that in the event of a collapse of any of the driving and braking spokes, the truss spokes will temporarily perform the functions of driving and braking spokes in addition to their bracing functions.

The invention will be hereinafter fully set forth and particularly pointed out in the claims.

In the accompanying drawing:—

Figure 2:
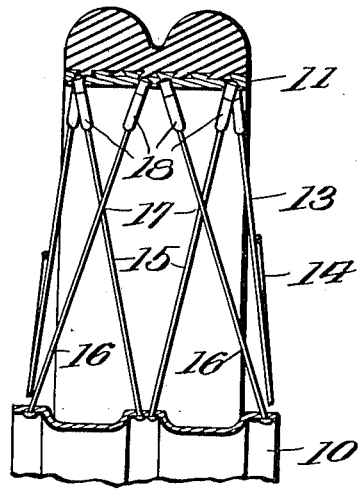

Figure 1 is a side elevation illustrating a portion of a wheel constructed in accordance with the present invention. Fig. 2 is a transverse sectional view thereof.

Referring to the drawing, 10 designates a hub and 11 a rim, both of which may be of any suitable or desired construction. Two sets of driving and breaking spokes connect the respective ends of the hub with the corresponding edges of the rim, each set of spokes consisting of spokes 12 and 13, arranged in pairs and crossing each other contiguous to the hub as indicated at 14.

Extending from the position between the ends of hub 10 to the edges of rim 11, are truss or torque-and-shock-resisting spokes consisting of a plurality of pairs of spokes 15, diverging from the hub to the edges of the rim, their outer ends being connected to the rim in alinement with the ends of the spokes 12 and 13. Coöperating with the spokes 15 are additional pairs of truss spokes 16 converging from the ends of the hub to the rim, the outer ends of the spokes 16 being located approximately at the middle of the rim, the inner ends of the spokes 15 being arranged approximately at the middle of the hub. The inner ends of the spokes 16 are approximately in alinement longitudinally of the hub, and the outer ends of said spokes are arranged approximately in alinement transversely of the rim, the sets of spokes crossing each other as indicated at 17. It will also be noted that the spokes 15 and 16 are approximately in alinement with the points of intersection of the spokes 12 and 13. The outer ends of all of the spokes are engaged by the usual threaded thimbles 18 by means of which the tension of the spokes may be regulated.

By referring to Fig. 2 of the drawing it will be readily understood that the sets of spokes 15 and 16 constitute to all intents and purposes trusses so arranged that a technically true truss-suspension of the parts is provided, capable of resisting all shocks encountered in traveling over rough roads, no matter in what direction applied. It will be particularly noted that the truss spokes tend to transmit all shocks applied to the rim, longitudinally the full length of the hub, whereby it is possible to provide heavy spokes, together with heavy rim and hub construction, with a minimum length of hub, such as is desirable for motor trucks and similar purposes.

Having thus explained the nature of the invention and described an operative manner of constructing and using the same, although without attempting to set forth all of the forms in which it may be made, or all of the forms of its use, what is claimed is:

1. An improved wheel comprising a hub, a rim, driving and braking spokes connecting the hub and rim, and a plurality of sets of truss spokes connecting the hub and rim, each set consisting of a pair of spokes converging from the ends of the hub to the rim and a pair of spokes diverging from the hub to the rim.

2. An improved wheel comprising a hub, a rim, driving and braking spokes connecting the hub and the rim, and a plurality of sets of truss spokes connecting the hub and the rim, each set consisting of a pair of spokes converging from the ends of the hub to the rim and a pair of spokes diverging from the hub to the rim, the spokes of each pair crossing the contiguous spokes of the other pair.

3. An improved wheel comprising a hub, a rim, driving and braking spokes connecting the hub and the rim, and a plurality of sets of truss spokes connecting the hub and the rim, each set consisting of a pair of spokes converging from the ends of the hub to the rim and a pair of spokes diverging from the hub to the rim, the inner ends of the spokes of each set being arranged approximately in line longitudinally of the hub.

4. An improved wheel comprising a hub, a rim, driving and braking spokes connecting the hub and the rim, and a plurality of sets of truss spokes connecting the hub and the rim, each set consisting of a pair of spokes converging from the ends of the hub to the rim and a pair of spokes diverging from the hub to the rim, the outer ends of the spokes of each set being arranged approximately in line transversely of the rim.

5. An improved wheel comprising a hub, a rim, driving and braking spokes connecting the hub and the rim, and a plurality of sets of truss spokes connecting the hub and the rim, each set consisting of a pair of spokes converging from the ends of the hub to the rim and a pair of spokes diverging from the hub to the rim, the inner ends of the spokes of each set being arranged approximately in line longitudinally of the hub, the outer ends of the spokes of each set being arranged approximately in line transversely of the rim.

6. An improved wheel comprising a hub, a rim, driving and braking spokes connecting the hub and rim, and a plurality of sets of truss spokes connecting the hub and rim, each set consisting of a pair of spokes converging from the ends of the hub to the middle of the rim and a pair of spokes diverging from the middle of the hub to the edges of the rim.

7. An improved wheel comprising a hub, a rim, driving and braking spokes connecting the hub and the rim, and a plurality of sets of truss spokes connecting the hub and the rim, each set consisting of a pair of spokes converging from the ends of the hub to the middle of the rim, and a pair of spokes diverging from the middle of the hub to the edges of the rim, the ends of all of the spokes being substantially in alinement.

8. An improved wheel comprising a hub, a rim, driving and braking spokes connecting the hub and rim and arranged in pairs, the spokes of each pair crossing each other, and a plurality of sets of truss spokes connecting the hub and the rim, each set consisting of a pair of spokes converging from the ends of the hub to the rim and a pair of spokes diverging from an intermediate portion of the hub to the rim.

In testimony whereof I have hereunto set my hand.

HENRY H. MORETON.